(12) United States Patent
Minteer (10) Patent No.: US 6,188,494 B1
(45) Date of Patent: Feb. 13, 2001

(54) FIBER-OPTIC TRANSCEIVER FOR LONG DISTANCE DATA COMMUNICATIONS

(75) Inventor: Timothy M. Minteer, Pullman, WA (US)

(73) Assignee: Schweitzer Engineering Laboratories, Inc., Pullman, WA (US)

( * ) Notice: Under 35 U.S.C. 154(b), the term of this patent shall be extended for 0 days.

(21) Appl. No.: 08/953,170

(22) Filed: Oct. 17, 1997

(51) Int. Cl.[7] .................................................. H04B 10/00
(52) U.S. Cl. .......................... 359/152; 359/184; 359/185; 359/186
(58) Field of Search ..................... 359/152, 184, 359/185, 186; 370/212, 213, 214, 342; 375/238, 239, 219, 220

(56) References Cited

U.S. PATENT DOCUMENTS

| | | | |
|---|---|---|---|
| 4,481,676 | * 11/1984 | Eumurian et al. | 455/608 |
| 4,584,719 | * 4/1986 | Miller | 455/608 |
| 4,713,841 | * 12/1987 | Porter et al. | 455/608 |
| 5,905,758 | * 5/1999 | Schweiter, III et al. | 375/257 |
| 5,914,976 | * 6/1999 | Jayaraman et al. | 372/50 |

* cited by examiner

Primary Examiner—Leslie Pascal
Assistant Examiner—Hanh Phan
(74) Attorney, Agent, or Firm—Jensen & Puntigam, P.S.

(57) ABSTRACT

A fiber-optic transceiver receives from and transmits to an associated electronic terminal device, such as a protective relay, digital data signals. Fiber-optic transceivers can be positioned at opposite ends of a connecting fiber-optic line. Power for each transceiver is obtained from its associated electronic device. The transceiver includes a transmit section, a receive section, a handshake section to provide feedback of control signals which may be required by the associated electronic terminal device, and a voltage supply section. A particular optical coding arrangement is used to convert the digital data signal from the terminal device to a series of optical pulses, wherein a pair of optical pulses represents a rising edge of the digital data signal from the electronic device, while a single pulse represents the falling edge of the data signal. Additional pairs of pulses and single pulses may follow the initial one, depending upon the length of the high and/or low portions of the data signal. A receive portion of the transceiver receives a series of optical pulses from the fiber-optic cable, recognizes the double and single optical pulses, and reconstructs a digital data signal therefrom.

17 Claims, 7 Drawing Sheets

```
Checksum  DA13
device PLC18V8Z;

CLK      = 1    'Input:  800KHz
TXD      = 2    'Input:  Inverted EIA-232 TXD pin
OE       = 11   'Input:  Tied to ground
CNT3     = 12   'Output: Counter bit 3
CNT2     = 13   'Output: Counter bit 2
CNT1     = 14   'Output: Counter bit 1
CNT0     = 15   'Output: Counter bit 0
OUTPUT   = 16   'Output: Active high when FIBER is pulsing
CHANGE   = 17   'Output: Active when TXD changes
BUFTXD   = 18   'Output: Buffered /TXD
FIBER    = 19   'Output: Fiber signal
GND      = 10
VCC      = 20

FIBER := /CNT0 * /CNT1 * /CNT2 * /CNT3 * /OUTPUT * /CHANGE
       + FIBER * /OUTPUT * /CNT0 * /CNT1 * /CNT2 * /CNT3
       + /FIBER * OUTPUT * CNT0 * /CNT1
       + FIBER * OUTPUT * /CNT0 * CNT1;

BUFTXD /:= /TXD * CHANGE
        + /BUFTXD * /TXD
        + /BUFTXD * /CHANGE
        + /BUFTXD * FIBER * /CNT0 * /CNT1
        + /BUFTXD * OUTPUT * /CNT1
        + /BUFTXD * /FIBER * OUTPUT * /CNT0;

CHANGE := TXD * /BUFTXD
        + /TXD * BUFTXD;

OUTPUT := FIBER * /CNT0 * /CNT1 * /CNT2 * /CNT3
        + OUTPUT * /BUFTXD * CNT0 * /CNT1 * /CNT2
        + OUTPUT * CNT0 * /CNT1 * CNT3
        + OUTPUT * /FIBER;

CNT0 := /CNT0 * CNT1 * /CHANGE
      + /CNT0 * CNT2 * /CHANGE
      + /CNT0 * CNT3 * /CHANGE
      + /CNT0 * FIBER
      + /CNT0 * OUTPUT
      + CNT0 * FIBER * OUTPUT * CNT2 * /CNT3
      + CNT0 * FIBER * CNT1 * CNT2
      + /FIBER * CHANGE * /OUTPUT;

CNT1 := /CNT1 * CNT0 * /FIBER
      + /CNT1 * CNT0 * /BUFTXD
      + /CNT1 * CNT0 * CHANGE
      + /CNT1 * CNT0 * /OUTPUT
      + CNT1 * /CNT0
      + CNT1 * FIBER * CNT0 * /CNT3
      + /FIBER * CHANGE * /OUTPUT;

CNT2 := /CNT2 * CNT0 * CNT1 * /FIBER * /CHANGE * /OUTPUT
      + CNT2 * /CNT0 * /CHANGE
      + CNT2 * /CNT1 * /CHANGE
      + /CNT2 * FIBER * CHANGE * /OUTPUT * /CNT0
      + CNT2 * OUTPUT * TXD
      + /CNT2 * TXD * /BUFTXD * CHANGE * OUTPUT * /CNT0 * /CNT3
      + FIBER * CNT0 * CNT1 * CHANGE * CNT3
      + FIBER * CNT0 * CNT1 * BUFTXD * /CHANGE * /CNT3;

CNT3 := /CNT3 * CNT0 * CNT1 * CNT2 * /FIBER * /CHANGE
      + CNT3 * /CNT0 * /CHANGE
      + CNT3 * /CNT1 * /CHANGE
      + CNT3 * /CNT2 * /CHANGE
      + /CNT3 * FIBER * BUFTXD * /CHANGE * OUTPUT * CNT0
      + /CNT3 * /BUFTXD * CHANGE * /CNT1 * /CNT2
      + CNT3 * OUTPUT
      + CNT3 * FIBER * /CHANGE;
```

```
Checksum   815E
device PLC18V8Z;

C800KHZ  = 1    'Input:  800 KHz
FIBERIN  = 2    'Input:  Input signal from receiver (0 = light rec.)
OE       = 11   'Input:  Tied to ground
SPARE    = 12   'Output: Spare output
RXDOUT   = 13   'Output: Signal for EIA-232 RXD
CNT2     = 14   'Output: Counter bit 2
CNT1     = 15   'Output: Counter bit 1
CNT0     = 16   'Output: Counter bit 0
REG2     = 17   'Output: Register to determine number of BUFFIBER transitions
REG1     = 18   'Output: Register to determine number of BUFFIBER transitions
BUFFIBER = 19   'Output: Buffered FIBERIN signal
GND      = 10
VCC      = 20

BUFFIBER /:= /FIBERIN;

REG1 := /BUFFIBER
      + REG1 * REG2;

REG2 := /REG2 * BUFFIBER * REG1 * /CNT0 * CNT1
      + /REG2 * BUFFIBER * REG1 * CNT0 * /CNT1
      + /REG2 * BUFFIBER * REG1 * /CNT1 * CNT2
      + /REG2 * BUFFIBER * REG1 * CNT1 * /CNT2
      + REG2 * /CNT0
      + REG2 * /CNT1
      + REG2 * /CNT2;

CNT0 := /CNT0 * /BUFFIBER * /REG1
      + /CNT0 * CNT1
      + /CNT0 * CNT2;

CNT1 := /CNT1 * CNT0
      + CNT1 * /CNT0;

CNT2 := /CNT2 * CNT0 * CNT1
      + CNT2 * /CNT0
      + CNT2 * /CNT1;

RXDOUT := CNT0 * CNT1 * CNT2 * /FIBERIN
        + CNT0 * CNT1 * CNT2 * REG1 * REG2
        + RXDOUT * /CNT0
        + RXDOUT * /CNT1
        + RXDOUT * /CNT2;

SPARE := 0;
```

FIG. 8

FIBER-OPTIC TRANSCEIVER FOR LONG DISTANCE DATA COMMUNICATIONS

TECHNICAL FIELD

This invention generally concerns the fiber-optic communication of asynchronous data between widely spaced electronic devices, such as protective relays, in a power system, and more specifically concerns a transceiver for use on a fiber-optic communication line, the transceiver converting digital electronic signals from the electronic device to corresponding optical signals and vice versa.

BACKGROUND OF THE INVENTION

Systems for asynchronous communication between electronic devices which generate and receive digital signals, such as power system protective relays but also including other electronic devices such as computers, etc., are well known. In asynchronous communication, a transmitting electronic device will typically produce a ground referenced signal for communication with another such device. That signal is often transmitted over a metal cable to a receiving device, which measures the received signal against ground. Asynchronous communication typically uses the EIA-232 ASCII communication format. The internal clocks of the transmitter and the receiver are not synchronized in asynchronous communications.

The metal cable has a certain capacitance. If the data communication has a maximum Baud rate of 38.4 kBaud, the typical maximum distance between a transmitter and receiver will be less than 50 feet. This is disadvantageous in those circumstances, such as in power systems, where the distance between two electronic devices will be significantly greater than 50 feet. For instance, nine miles (15 km) may be a typical distance between electric power substations in concentrated load centers, while in many cases, the distance between two substations will be significantly greater than nine miles and in some cases greater than 50–70 miles.

In many applications, such as between two power system protective relays, high security and reliability are required for the transmission of data. An example of such data communication where security and reliability are important requirements is the transmission of information relative to whether the location of a fault is on a power transmission line between two specific protective relays or is on some other transmission line.

Metallic cables, however, in conventional communications systems, have several disadvantages, including safety problems which can occur during electrical faults. Also, there will typically be a substantial increase in the bit error rate (BER), which results in communication of data becoming unreliable, during such faults. Further, metallic cables are susceptible to interference associated with electrical disturbances such as lightening which may result in momentary or permanent damage to the communications electronics.

Fiber-optic cables have become the preferred method of communication where high security and reliability is required. Fiber-optic cables in addition provide the desired electrical isolation which eliminates or significantly reduces safety concerns with metallic cables and eliminates or significantly reduces the increase in BER during faults. On the other hand, fiber-optic cables have some disadvantages, most of which concern power requirements. The attenuation of fiber-optic cable is known, depending upon the characteristics of the cable. A significant objective relative to fiber-optic cable transmission is to maximize the optical power budget, which is calculated according to a known formula, in order to provide the greatest distance capability with the least power.

High power lasers are frequently used in fiber-optic communication systems to achieve long distance communication. Such lasers, however, are typically large, expensive, require significant electrical power to operate, and pose a safety hazard to the eyes and skin of the operator. In addition, if it is desired that the transceiver obtain its power from the electronic device and hence be mountable to the electronic device, high powered lasers cannot be used.

A low power laser known as the Vertical Cavity Surface Emitting Laser (VCSEL), while closer to desirable power output loads, and while in addition having a desirable small size, still has an optical power output which exceeds recognized eye safety limits. It is important and desirable for the present invention to provide a transceiver which operates below the recognized eye safety limits.

There are also disadvantages of currently available optical receivers used in long distance fiber-optic communication. Such receivers should be as sensitive as possible, such as for instance APD (avalanche photodetector), or a pin photodiode. An APD, however, would not be an appropriate choice because of the requirements of large negative bias and cooling. A pin photodiode can be used, although such configurations usually require that the pin diode be reverse biased and configured in the photoconductive mode, which can lead to damage or the amplifiers being driven to saturation if too strong a signal is receiver. In such cases, attenuation jumpers are typically provided in the fiber-optic line, which is undesirable. Hence, a transceiver for fiber-optic communication is needed which meets existing eye safety standards yet has enough power and sensitivity to communicate over a variety of distances, including short distances and long distances, without the need for attenuation jumpers.

SUMMARY OF THE INVENTION

Accordingly, the present invention is a fiber-optic transceiver for communication of data, comprising: means for receiving from a terminal device such as a power system protective relay, a digital data signal having high states and low states, means for generating a series of optical pulses from the data signal, wherein a first optical pulse arrangement represents a rising edge of the data signal and a second optical pulse arrangement represents a falling edge of the data signal, the first and second pulse arrangements, respectively, occurring repetitively at preselected times during said high and low states if the high and low states exceed a preselected length of time; means for transmitting said series of optical pulses along a fiber-optic cable; means for receiving a transmitted series of optical pulses from a fiber-optic cable and for recognizing first and second pulse arrangements in the series of optical pulses and reconstructing a digital data signal having high and low states therefrom, the reconstructed digital data signal being a substantial replication of the digital data signal from which the series of optical pulses were generated; and means for providing said reconstructed digital data signals to the terminal device.

BRIEF DESCRIPTION OF THE DRAWINGS

FIG. 6 is a list of logic equations used in the transmit encoder.

BEST MODE FOR CARRYING OUT THE INVENTION

Figure 1:
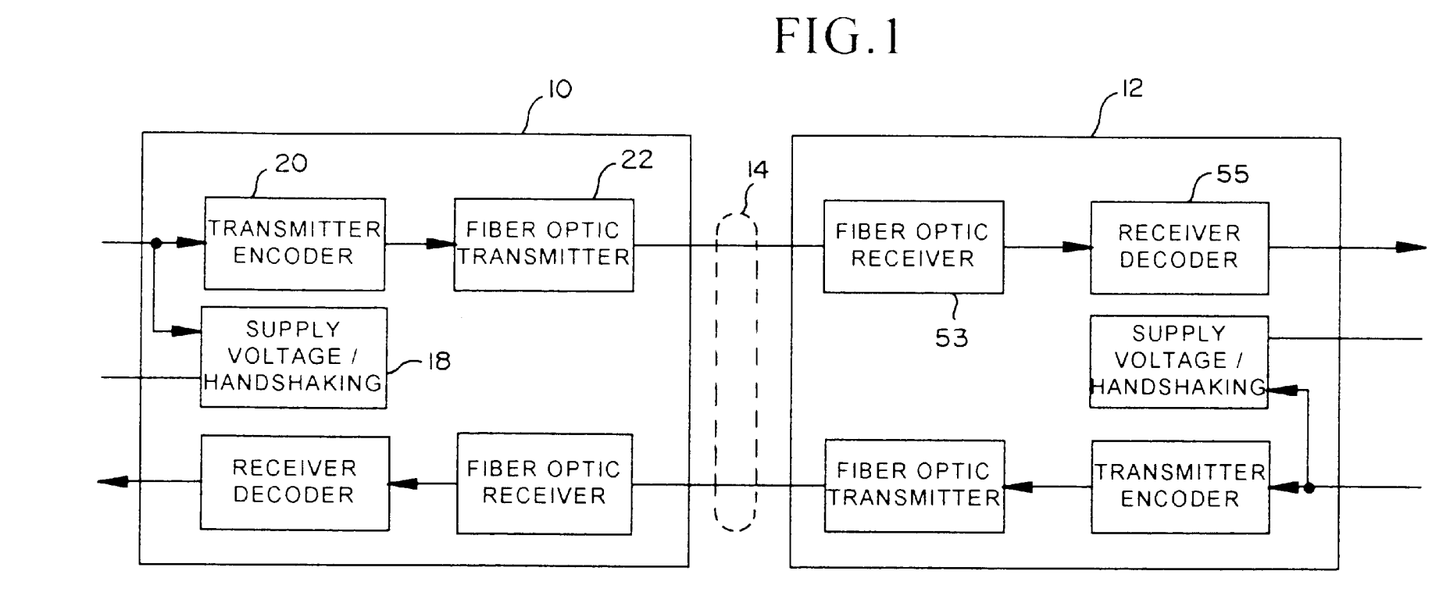
FIG. 1 is a block diagram showing the basic arrangement of a data communication system using the transceiver of the present invention.

FIG. 1 is a generalized block diagram illustrating the transceiver of the present invention connected to a transmission line. Two transceivers 10 and 12 are shown connected to opposing ends of a fiber-optic line 14. The fiber-optic line 14 can be various lengths, including relatively short (approximately 0.5 meters) to quite long (greater than 100 kilometers). The actual line distance which is possible will depend on the wavelength of the optical transmitter and the thickness of the optical fibers. For instance, a wavelength of 850 nanometers (NM), using multimode fiber (50 micrometers thick) will permit a line distance of up to 15 kilometers, while wavelengths of 1300 NM with a single mode fiber will permit a distance of up to 100 km. In the embodiment shown, two-way communication is illustrated, so transceivers 10 and 12 are capable of operating in either the transmitting or receiving mode, as appropriate.

For purposes of this explanation, transceiver 10 will be discussed in its transmitting mode, while transceiver 12 will be discussed in its receiving mode. The modes will be reversed when communication is from transceiver 12 to transceiver 10. Transceiver 10 receives E1A-232 digital signals from an electronic device, such as a protective relay on a power transmission line. A "handshaking" circuit provides feedback of control signals from the electronic device back to the electronic device to fulfill any handshaking requirements of the electronic device. This can be accomplished both when the transceiver is to transmit or receive.

The power for the transceiver 10 is supplied by a voltage supply circuit, shown at 18, which includes the handshaking circuit. This is not a conventional power supply; rather, the transceiver 10 is designed to obtain its power from the electronic device itself. The voltage supply circuit 18 processes selected signal(s) from the electronic device and provides the power signals to the various transceivers, including a transmitter encoder 20 which drives a fiber-optic transmitter 22 for transmission of the resulting optical pulses over fiber-optic line 14 to transceiver 12 at the other end of the line. The structural details of transmitter encoder 20 and transmitter 22 will be discussed in further detail in following paragraphs. The transceiver 10 also includes a fiber-optic receiver and receiver decoder, which are explained in more detail below.

Figure 2:
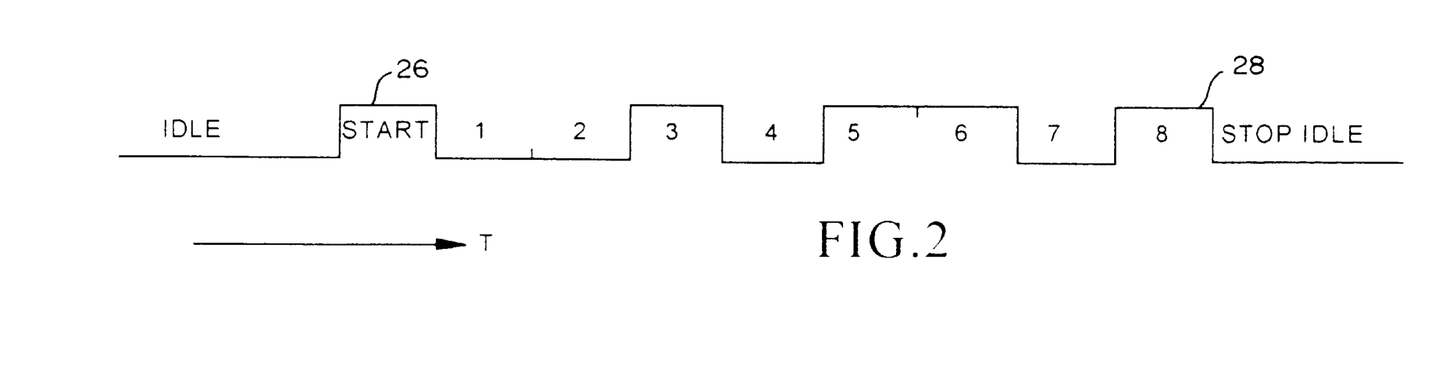
FIG. 2 is a diagram showing simplified data character transmission.

FIG. 2 shows a typical eight-bit digital character, with a start bit 26 and a stop bit 28, serially encoded against time. This eight-bit character is representative of conventional asynchronous data communication. At a Baud rate of 40,000 bits per second, which is typical, the bit interval would be 25 microseconds.

With a conventional fiber-optic transceiver, the transceiver in its transmit mode encodes the digital electrical signal of FIG. 2 into a corresponding optical signal, which would then be transmitted over the fiber-optic line. At the other end of the line, the fiber-optic transceiver in its receive mode will decode the received fiber-optic signal and reproduce the original digital electrical signal.

The present invention includes a particular optical coding system for an electrical data signal. In this coding approach, when the original transmit data signal goes high (rising edge), double optical pulses are produced and transmitted, while when the transmit data goes low (falling edge), a single optical pulse is produced and transmitted. The time between a rising or falling edge of the electrical signal data and the leading edge of the corresponding optical pulse arrangement (double pulse or single) is fixed, i.e. slightly less than one-bit interval in the embodiment shown or slightly less than 25 microseconds for a 40 kBaud rate. The width of the optical pulses will be around ⅒th of the bit interval.

If the transmit data remains at a low signal level for successive bits, additional single optical pulses are produced and transmitted at a repetition rate in the embodiment shown of approximately one optical pulse per ½-bit interval. If the transmit data remains at a high level for successive bits, the double optical pulses are produced and transmitted at a repetition rate of about one double optical pulse pair per bit interval. Hence, the total energy of the single and double pulses, over one bit interval, is approximately the same. The rising edges of the successive optical pulses are separated by about one-third of the bit interval in the embodiment shown. The timing details of the optical pulses will be discussed further in the following paragraphs.

Figure 3:
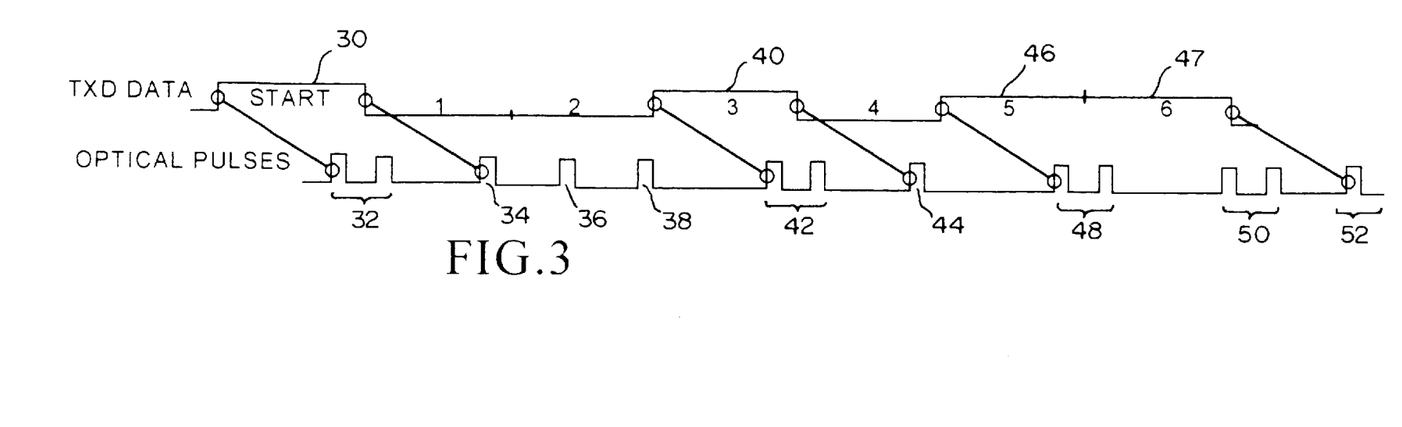
FIG. 3 is a data character transmission with the optical signal arrangement of the present invention.

FIG. 3 illustrates the optical coding principles of the present invention discussed briefly above, In FIG. 3, a fixed time following the rising edge of the start pulse 30, in the transmitted (TXD) data, a pair of optical pulses 32 are produced and transmitted. Then, a fixed time after the falling edge of start pulse 30, a single optical pulse 34 is transmitted. When the transmit data remains low (bits 1 and 2 in FIG. 3), additional single pulses 36 and 38 are transmitted at fixed intervals. In this example, the transmit signal is low for a first bit and a second bit and a total of three single optical pulses are transmitted. The third data bit 40 is high, so after a fixed time following the rising edge of data bit 40, double optical pulses 42 are transmitted. The falling edge of the data bit 40 will result in a single pulse 44.

The rising edge of data bit 46 will result in a first double optical pulse 48 a fixed time later, followed by an additional double optical pulse 50, which occurs a fixed time later because the following data bit 47 is still high. A single optical pulse 52 follows the falling edge of data bit 47 a fixed time thereafter. Since double pulse 50 was in the process of being transmitted at the time of falling edge of data bit 47, double pulse 50 is completed and transmitted.

Typically, the actual optical pulse widths and the specific timing of the pulses can be optimized to achieve the greatest signal strength for a given optical pulse transmission.

Referring again to FIG. 1, transceiver 12 receives the optical pulse data such as shown in FIG. 3 and described above. A receiver portion 53 of the transceiver detects whether a single or double optical pulse has been received, depending upon the preestablished timing of the pulses. If a single optical pulse is detected, a decoder 55 maintains the resulting reconstructed receive signal at a low level. If a double optical pulse is detected, a rising edge signal to a high level is produced.

A decision point (in time) as to whether a single or double pulse has been received is typically a fixed period of time following the first rising edge of the received optical pulse (or pulses). In the embodiment shown, the decision point is approximately ⅖ of a bit interval from the rising edge of the first optical pulse, whether it be a single or double pulse. The reconstructed receive signal changes levels only at this decision point. Since the transmitter in transceiver 10 keys on the edges of the transmit data and the receiver in transceiver 12 keys off the rising edges of the received optical pulses, the resulting reconstructed receive signal is a near replica of the original transmit signal.

The significant advantage of the above optical coding approach is a relatively low duty cycle. In the embodiment shown, the duty cycle of the optical pulses is no greater than 20%. The duty cycle can even be less, depending upon the number of actual bits contained in the transmit electrical data stream. This low duty cycle has the advantage of reducing the optical transmit power to safe levels. For instance, in the case of an 850 NM wavelength VCSEL laser, the average optical transmit power will be reduced from a previous level of 1.5 milliwatt, which is above eye safety levels of 0.44 milliwatt, down to 0.3 milliwatt, which is well below eye safety levels. A duty cycle higher than 20, probably up to at least 30, could be used and still be within the desired safety standards.

The above arrangement has a number of significant advantages. First, the electrical data stream from the electronic device can be used as it is, without any regard to protocol, data format or Baud rate. Further, no buffering is required in the transceiver for the transmit signal. Further, the overall delay of the data signal from the time of its entering the transmitter transceiver 10 to exiting the receiver transceiver 12 is relatively small, typically less than 1.5 bit intervals. Still further, as indicated above, the low duty cycle reduces the average optical power of the transmitter to a safe level. The optical power is optimized so as to satisfy appropriate eye safety levels, while providing enough power for long distance communication. For instance, the distance goals set forth above are achievable with the present invention.

The low duty cycle in addition permits the electrical power requirements of the transceiver to be obtained from its associated electronic device. The consistent duty cycle permits the receiver transceiver 12 to be AC-coupled, eliminating any DC noise associated with the "dark" current (current which flows from the PIN photodiode in the receiver when no light is being received). The system can be used with speeds up to 40 kBaud, while maintaining a BER of less than $10^{-9}$, for various fiber cable distances, without any need for attenuation jumpers.

Figure 4:
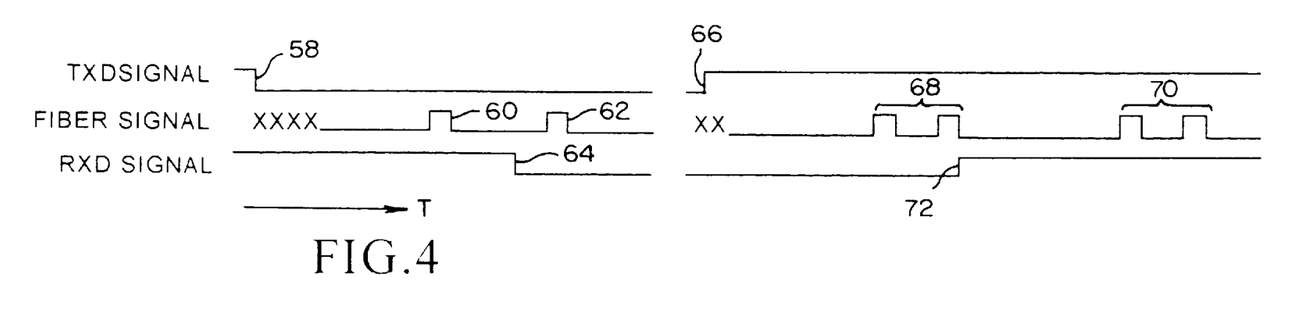
FIG. 4 is a signal diagram showing the timing relationship between the digital data signals from an electronic device and the optical signals of the present invention.

FIG. 4 illustrates one particular timing arrangement between the transmit signal (TXD), the resulting optical signal (fiber) and the reconstructed receive signal (RXD). It should be emphasized that other timing arrangements within the approach of the present invention can be used. The transmit signal shows a falling edge at 58. 20 microseconds later, a single fiber-optic pulse 60 occurs. The fiber-optic pulse 60 has a pulse width of 2.5 microseconds. If the transmit signal continues to be low, additional single pulses such as 62 are transmitted. In the embodiment shown, these additional single pulses will occur every 13.5 microseconds, as long as the transmit signal is low.

When the single optical pulses in FIG. 4 are applied to a receiver, the falling edge 64 of the reconstructed receive signal will occur 10 microseconds from the start of the single pulse 60. Hence, in the embodiment shown, there is approximately a 30-microsecond delay between the transmit and the reconstructed receive signals, apart from any delay in transmission.

A rising edge transmit signal is also illustrated. A rising edge is shown at 66 in the transmit data signal. Twenty microseconds later, a double pulse 68 is transmitted. In the embodiment shown, the total width of the double pulse is 10 microseconds, while the time between the rising edges of the successive double pulses is 7.5 microseconds, leaving a pulse width of 2.5 microseconds for each of the double pulses. 25.75 microseconds later, if data transmit signal is still high, another double pulse 70 is transmitted.

At the receiver, a rising pulse 72 is reconstructed approximately 10 microseconds after the double pulse 68 is received and recognized, with a delay of approximately 30 microseconds apart from any transmission delay. Again, however, it should be understood that other timing arrangements can be used. The above-described timing arrangement is for illustration and explanation of the invention.

The transmitter portion of the fiber-optic transceiver uses a VCSEL transmitter which operates at 850 NM, which is in the infrared range. The transmitter could also use an LED instead of a laser. The laser transmitter is controlled with a constant current source of around 12 milliamps. As indicated above, the duty cycle will be approximately 20% and can be lower than that, depending upon the data sequence to be transmitted. The maximum peak optical power output of the laser in the embodiment shown is less than 1.5 milliwatts over a temperature range of −40° to 85° C. As indicated above, this results in an average power which is well under the required safety limitations.

Figure 5:
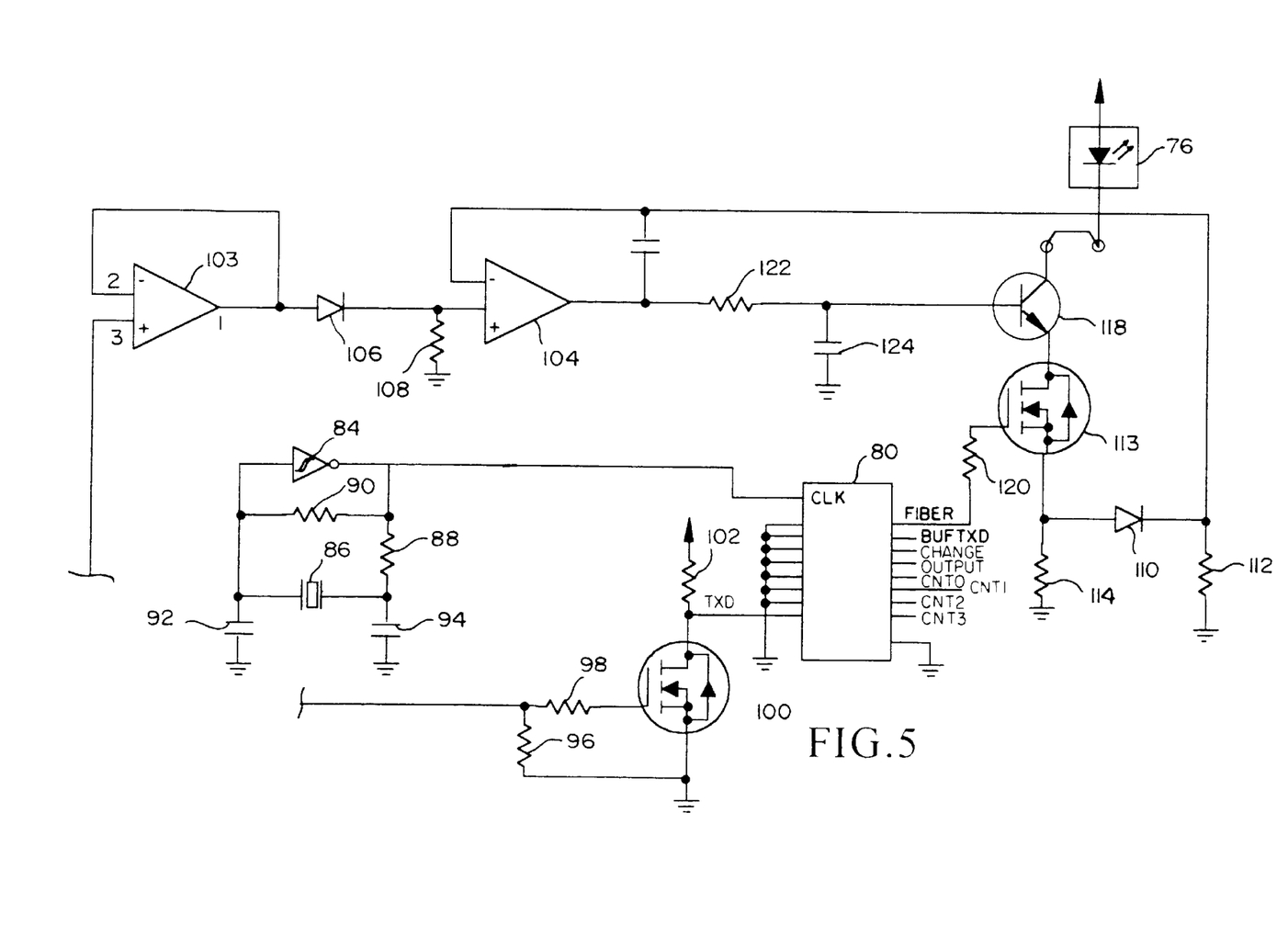
FIG. 5 is a schematic diagram showing the transmitter portion of the transceiver of the present invention.

FIG. 5 shows the transmitter circuit of the present invention. The voltage supply circuit (not shown) provides both positive and negative voltages to the transmitter circuit. As indicated above, the power is obtained from the associated electronic device and processed minimally to provide the required voltage levels for the transceiver. The transmitter circuit shown in FIG. 5 in schematic form comprises the VSCEL laser 76, a ceramic resonator circuit, a transmitter encoder 80 which in the embodiment shown is a gate array logic processing circuit (GAL) which contains and executes logic equations for generating the pulses to be transmitted and a constant current source for driving laser 76.

The ceramic resonator circuit includes an inverter 84, a ceramic resonator 86, resistors 88 and 90 and capacitors 92 and 94. The ceramic resonator circuit produces an 800 kHz square wave clock signal at the output of inverter 84. The rising edge of this clock signal advances (clocks) the logic in the transmitter encoder 80.

The encoder 80 generates an output signal (shown as a "fiber" signal in FIG. 5), which causes light pulses to be transmitted from laser 76. When the electrical data signal which is to be transmitted from the electronic device is low, a 2.5 microsecond light pulse is transmitted every 13.5 microseconds. When the transmit signal is high, two 2.5 microsecond pulses are transmitted every 28.75 microseconds. The equations present in GAL 80 to generate these pulses are shown in FIG. 6.

The transmit signal is applied to the encoder 80 by means of a circuit which includes a resistor 96, a resistor 98, FET 100 and resistor 102. The signal to the encoder 80 is an inverted version of the electrical data signal. FET 100 produces the transition from the data signal voltage levels to the logic voltage levels used in the encoder.

The constant current source for the laser 76 drives the laser when the "fiber" signal from encoder 80 is high. The current is regulated, in the embodiment shown, between 11.5 milliamps to 13.5 milliamps over the selected temperature range. An approximate 1.2 volt reference is provided by operational amplifier 103 (pins 1,2 and 3). Operational amplifier (op-amp) 104 (pins 5, 6 and 7) is connected as a follower. The negative feedback path forces the voltage at pin 6 to follow the voltage at pin 5. The voltage on pin 5 is the buffered output of the voltage regulator less one Schottky diode drop, as determined by diode 106 and resistor 108. This diode drop compensates for the diode drop of peak detector diode 110 and resistor 112. The source of the feedback path of the op-amp follower is a peak detection circuit for the voltage across resistor 114. The output of the op-amp 104 thus remains at a fairly constant DC voltage, even though FET 113 is being turned on and off to generate the optical pulses.

Since the duty cycle of the light pulses will be fairly constant, the peak detector will have little ripple, which results in the output of the op-amp 104 remaining constant. The op-amp will drive transistor 118 into its active region the right amount of time to maintain a constant peak voltage across resistor 114, such that the peak voltage is equal to the voltage regulator reference voltage from op-amp 103, approximately 1.2 volts. The collector emitter voltage across transistor 118 will vary so as to keep the current flow through the laser constant whenever FET 113 is on. Resistor 120 in series with the gate of FET 113 will limit the current spike that could flow through transistor 118 when the FET is first turned on, while resistor 122 limits the transistor 118 base current when the transceiver is initially powering up. Capacitor 124 dampens the op-amp ringing that may occur when the FET 113 is initially turned on.

The output of laser 76 is a series of optical pulses, such as shown in FIG. 3. These optical pulses are then transmitted over the fiber-optic cable, of selected length, depending upon the application, to the transceiver at the other end of the line. The received optical pulses are applied to a receiver portion of the transceiver.

Figure 7A:
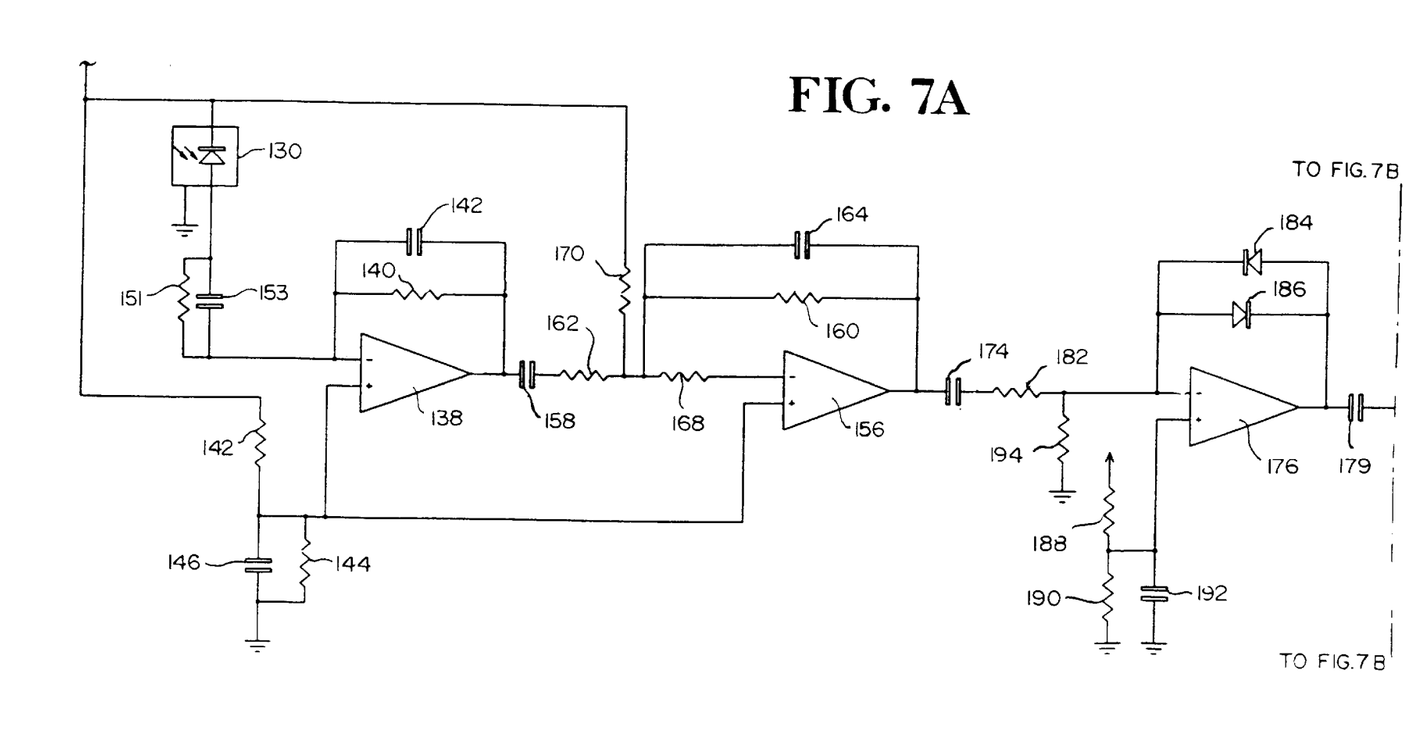
FIGS. 7A and 7B are schematic diagrams showing the receiver portion of the transceiver of the present invention.
Figure 7B:
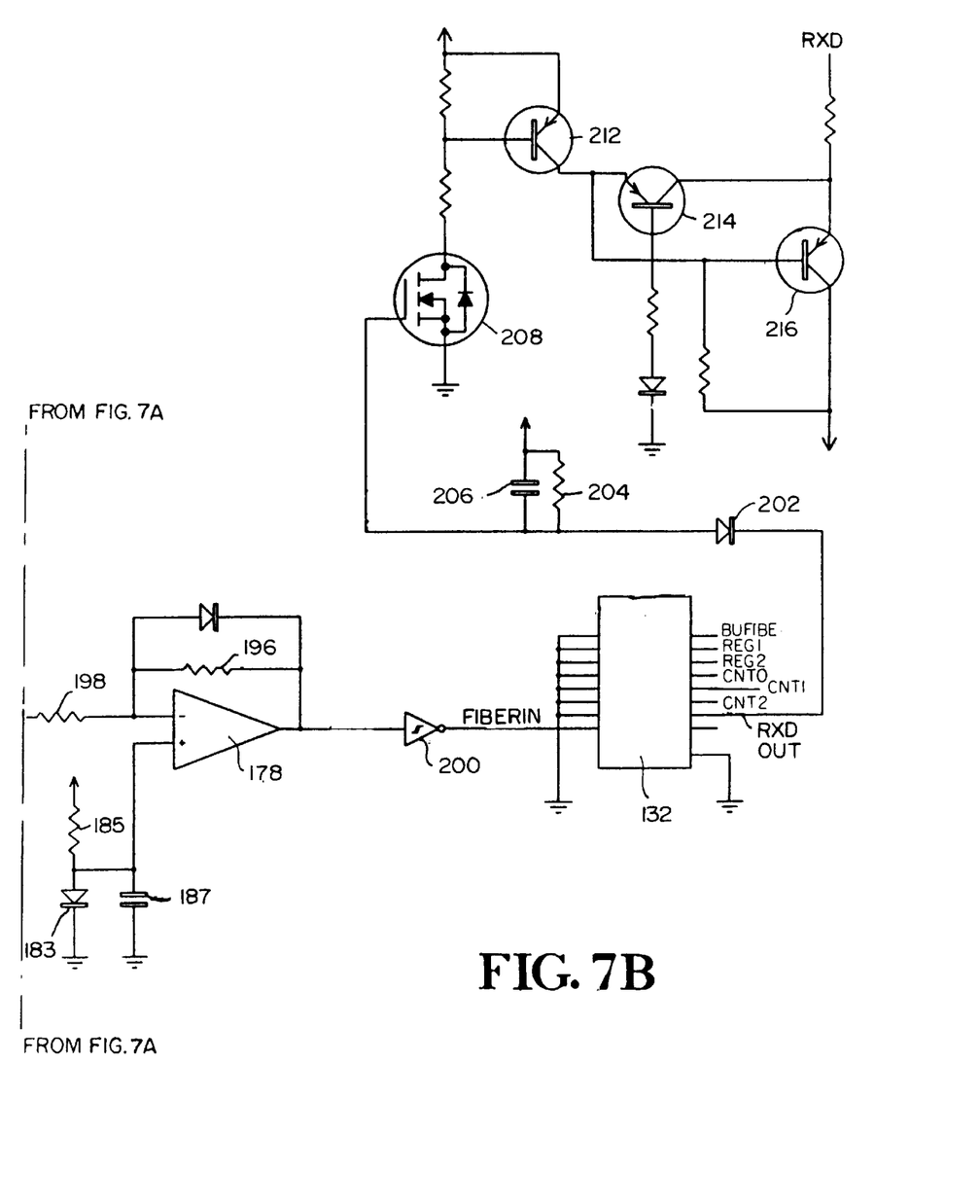

The receiver portion of the transceiver is shown in FIG. 7. Necessary power for the receiver is supplied by the voltage supply circuit which obtains its power from the associated electronic device to which it is connected, just like the transceiver at the transmitting end. The receiver circuit includes a pin photodiode 130, four op-amp stages, a GAL receiver decoder 132, which is similar to GAL 80 in the transmitter section and which converts the received optical pulses back to the original data signal form and a level shifting circuit to generate the data signal from GAL 132. GAL 132 in the embodiment shown is a gate array logic processing circuit which contains and executes the logic equations for decoding the received pulses into the original data signal.

The four op-amp stages convert the optical pulses received from the fiber-optic cable into digital pulses which have enough resolution that single pulses can be readily distinguished from double pulses. As indicated above, a single received optical pulse will result in the reconstructed data signal being low, while a double optical pulse will result in the data signal being high. The first op-amp 138 determines the receiver sensitivity level. It operates as a transimpedance amplifier, converting a current signal into a voltage signal. The first stage op-amp maximizes the signal-to-noise ratio (SNR) for a given optical receiver level. This is accomplished by choosing the largest possible value for feedback resistor 140, since signal strength is directly proportional to the value of resistor 140, while the noise is directly proportional to the square root of resistor 140.

The maximum value of resistor 140 is determined by the minimum allowable bandwidth and the minimum value of capacitor 142 necessary to maintain stability of op-amp 138. A practical minimum value for capacitor 142 is 1 pF, while the minimum allowable bandwidth is determined by the digital pulse resolution required at the output of the last op-amp stage, which in this particular case is approximately 160 kHz. The minimum value of 1 pF for capacitor 142 and a minimum band width of 160 kHz establishes the value of the feedback resistor to be 1 MOhm. For low level (weak) optical power signals, resistor 151 and capacitor 153 basically have no operational effect on the received signal, and the pin diode 130 is reverse-biased at approximately −3 volts. This reverse bias is accomplished with a supply voltage of +5 volts and a voltage divider formed by resistors 142, 144 and capacitor 146.

This circuit is connected to the positive input of op-amp 138. The output of op-amp 138, when there is no received optical pulses, will be approximately 2 volts, less the DC voltage drop of the pin diode "dark" current (when no light is being received) through the 1 MOhm feedback resistor 140. When an optical pulse (2.5 microseconds in the embodiment shown) is received, pin diode 130 produces 2.5 microseconds of current. The magnitude of the current pulse from the pin photodiode is based on the power level of the optical pulse and the responsivity of the pin photodiode. The gain of the op-amp 138 is approximately 10. At this gain level, a capacitor current divider exists between the feedback capacitor 142 and the parasitic capacitance of the op-amp input and pin photodiode. Approximately ½ to ¾ of the pin diode current then actually flows through the feedback resistor 140.

The first stage op-amp and associated circuitry is susceptible to noise, and accordingly is enclosed in an EMI-grounded shell, which shields the two high impedance nodes from radiated noise from the voltage supply circuit or the logic circuitry. The voltage supply for the first and second op-amps is filtered. The filtering removes unwanted noise generated by the supply voltage switching frequencies.

It is important in order to accommodate a large, dynamic range of optical power levels that the first stage op-amp not be allowed to saturate. If op-amp 138 were driven into saturation, the width of the digital pulse of the resulting electrical signal would be so large that it would be impossible to make a correct distinction between single and double pulses. The op-amp 138 is kept from saturation by the 20 MOhm resistor 151 which is located between pin photodiode 130 and the first stage op-amp 138. Once the average pin photodiode current exceeds 150 nanoamperes, the pin photodiode will no longer be reverse biased. At this point, the pin photodiode is operating in the photovoltaic mode. Removing the reverse bias from the pin diode during high levels of optical power will also protect the pin diode from damage.

Since the peak positive voltage at the pin diode anode cannot exceed the forward voltage diode drop of around 0.7 volts above the +5 volt supply, the peak current flowing through resistor 151 is limited to 185 nanoamperes. This guarantees that the first stage op-amp will not go into saturation. Thus, for high optical power signals, the pin diode is maintained in the photovoltaic mode. The value of capacitor 153 is chosen so that there is only a minimal difference in the magnitude of current pulses that flow through feedback resistor 140. Capacitor 153 has a value such that there is only a small difference in the magnitude of the current pulses between when the pin diode is just barely reverse-biased (photoconductive mode) and just barely forward-biased (photovoltaic mode). Hence, there will not be large variances in the magnitude of the current pulses where the pin diode alternates rapidly between the photovoltaic and photoconductive modes due to slight variations in duty cycle.

The first op-amp is decoupled from the second stage op-amp 156 by a capacitor 158. This capacitor 158 removes any DC signal which may be present in the op-amp output signal due to the photodiode "dark" current or first stage op-amp offsets. The primary purpose of op-amp 156 is to provide a large gain without introducing any significant levels of noise into the resulting signal. Op-amp 156 is configured as an inverting summing amplifier. Nominally, the AC signal gain is determined by feedback resistor 160 divided by the source resistor 162. The gain is limited, however, by the gain band width product (GBW) of the op-amp, which depends upon the characteristics of the particular op-amp selected. Feedback capacitor 164 with feedback resistor 160 provides a low pass filter with a corner frequency of around 160 kHz. Resistor 168 in series with the negative input of the op-amp limits the power consumption of the first and second stage op-amps for high levels of optical power.

Applied to the negative input of op-amp 156 is the output of a unity buffer amplifier which is actually internal of the op-amp. The output of the op-amp is adjusted such that the current into or out of the negative input of the op-amp 156 is maintained at zero. However, if the op-amp goes into saturation, the negative input could "sink" a significant amount of current. Resistor 168 limits this current. Resistor 170 causes a DC signal to be summed with the input signal. Therefore, the output of the second op-amp when no optical pulses are being received is approximately 1.4 volts.

For strong optical power signals, where the pin diode is in the photovoltaic mode, the output of the second stage op-amp will be at saturation. The DC level shifting introduced by resistor 170 causes the "window" of the first stage output signal to be adjusted downwardly. This DC adjustment keeps this "window" away from the upper portion of the signal where an undamped response of the first stage could be mistaken for a received optical pulse. The window is kept away from the lower portion of the signal as well, where the magnitude of a second 2.5 microsecond pulse is not as strong and could be missed.

The second op-amp stage is decoupled from the third stage by capacitor 174. This eliminates the DC current that was summed into the second op-amp stage, as well as any offset voltages and currents. The third op-amp 176 and fourth op-amp 178 in the embodiment shown are part of a dual op-amp. The purpose of the third stage op-amp 176 is to provide a gain of about 40 and to clamp the output signal at approximately ±0.7 volts. The third op-amp 176 is configured as an inverted summing amplifier. The input signal gain is determined by a "feedback" resistance divided by a source resistor 182. Since there is no feedback resistor per se, the feedback resistance is determined by clamping diodes 184 and 186.

For weaker signals at capacitor 174, the feedback resistance will be large, while for strong signals, the feedback resistance will be small. The gain of the third stage is also limited by the GBW of the op-amp. The output of the third stage will be fairly constant and the peak-to-peak voltage will remain somewhat less than 1.4 volts. The output signal will be centered about the DC bias (approximately 2 volts) of the op-amp, which is provided by the divider comprising resistor 188, resistor 190 and capacitor 192 connected to the op-amp. Resistor 194 causes a DC signal to be summed with the input signal.

The output of the third op-amp stage when there are no optical pulses being received will be slightly greater than 2 volts. For low level optical power signals, this addition of a DC level shifts the "window" for the third stage gain. In relation to the second op-amp stage output, this window shifts positive to be more centered about the peak-to-peak signal. This centering function causes the signal-to-noise ratio to be consistent when the second stage output is either at its high or low point.

The fourth stage op-amp 178 converts the input signal into a digital signal. The fourth stage 178 is decoupled from the third stage by capacitor 179. This is accomplished through an inverting op-amp configuration, using a feedback resistor 196 and a source resistor 198. The output of the fourth-stage op-amp saturates for positive output and is clamped just above ground for a low or negative output. A DC bias point of approximately 0.7 volts is derived from diode 183, resistor 185 and capacitor 187. The output of the op-amp 178 is applied to a Schmitt trigger buffer 200 before being fed into the receiver decoder 132. The output of the Schmitt trigger goes low (pulses) in response to optical pulses being received by the pin diode. The delay between the receipt of the received optical signal at the input to the first op-amp and the output to the Schmitt trigger will be typically around 5 microseconds.

The width of the pulses from the Schmitt trigger may also vary slightly, due to strength of the fiber-optic signal, temperature range variations, etc. For example, for a single 2.5 microsecond optical pulse, the corresponding width of the output signal from the Schmitt trigger may be anywhere from 3.7–9 microseconds. For the double optical pulses, the Schmitt trigger signal may be two narrow pulses or one long pulse. When the double optical pulse turns into one Schmitt trigger output pulse, the width of the pulse can vary between 12.1–15.6 microseconds in the embodiment shown. When both pulses are present, the pulses are at least 4.2 microseconds wide and the second pulse begins not more than 8.7 microseconds from the rising edge of the first pulse.

The receiver decoder 132 analyzes the input pulses from the Schmitt trigger circuit and generates the reconstructed digital signal. When only a single pulse is recognized, the decoder drives or maintains the receive digital signal low. When double pulses are recognized, the decoder drives or maintains the receive data signal high. Due to the ceramic resonator clocking the transmitter, the optical pulse widths received by the receiving transducer are very consistent, around 2.5 microseconds. The other timing for the optical pulses is quite consistent as well.

Figure 8:
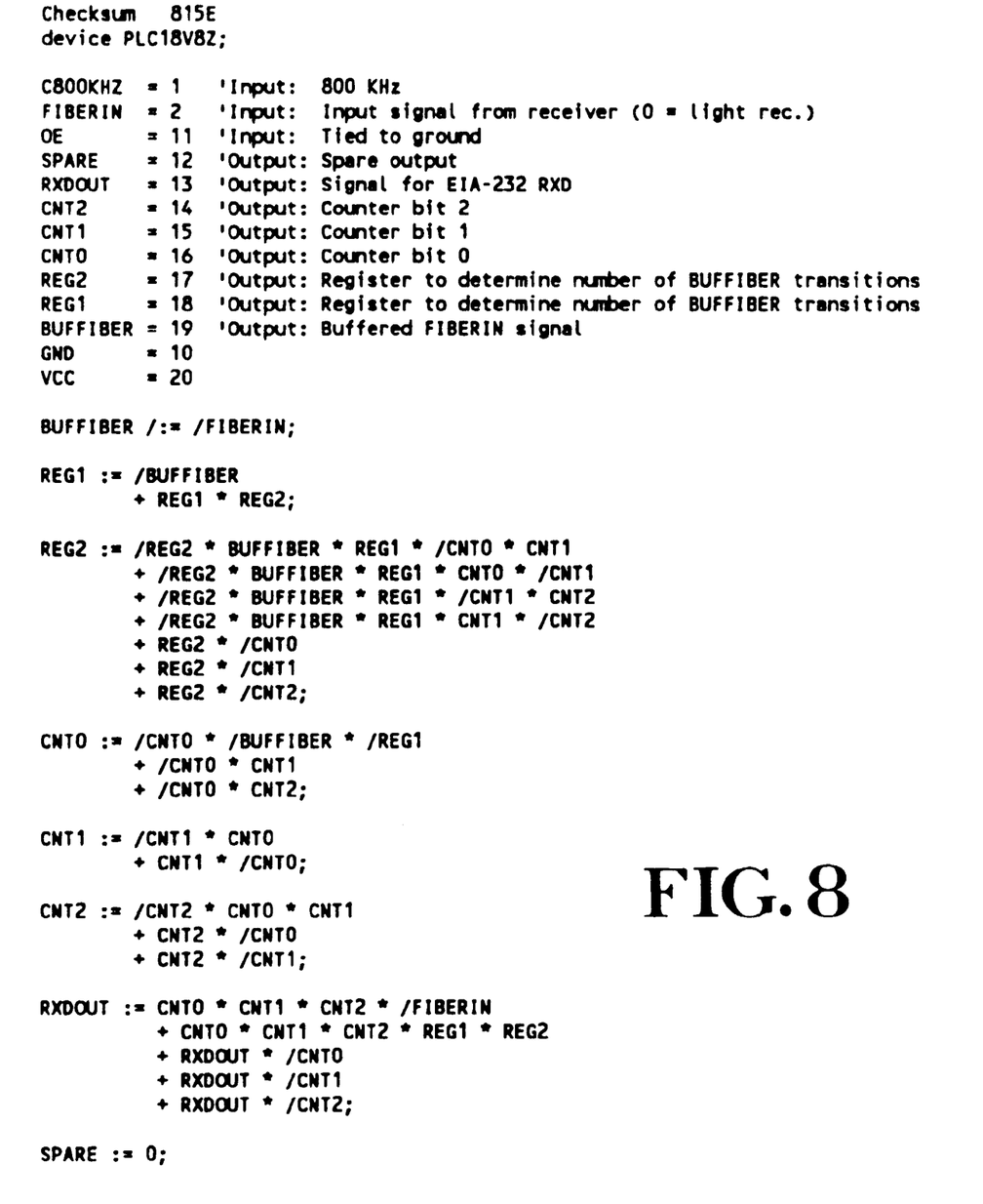
FIG. 8 is a list of logic equations used in the receiver encoder.

The receiver decoder logic clock rate is 1.25 microseconds, so that the decision point in the embodiment shown between single and double pulses can be anywhere between 10–11.25 microseconds. After 10 microseconds, the single optical pulse would no longer be present. For the double pulse, after 11.25 microseconds, either the falling edge of both pulses would have occurred, or the second pulse would still be present. This is the logic that the receiver decoder uses to reconstruct the original data signal. The decoder uses a three-bit counter to help count to 10 microseconds. It also uses two registers to count the number of pulses that have been received within the 10-microsecond span. FIG. 8 shows the set of logic equations used in receiver decoder 132 to decode the received optical pulses into the original transmit signal.

The actual data signal is generated by a level shifting transistor circuit. Diode 202, resistor 204 and capacitor 206 slightly delays the turning on of FET 208. This is done to balance the pulse widths of the high and low data signals. Otherwise, the pulse widths may be slightly distorted due to the FET used. When the received signal from the decoder 132 goes high, FET 208 will turn on, after the slight delay. When the receive signal from the encoder goes low, FET 208 will be driven off. The positive and negative reference voltages are provided by the transducer voltage supply.

For a high level, the output signal transistor 212 will turn on when the base current flows due to FET 208 turning on. In turn, transistor 214 turns on due to transistor 212 turning on. The receive signal switches to a low level whenever transistor 212 turns off, which turns transistor 214 off and turns transistor 216 on. The resulting signal is a reconstruction of the original data transmit signal.

Hence, a fiber-optic transceiver has been described which because of a particular optical pulse arrangement representing the digital data signal and a particular hardware implementation thereof provides a transceiver which meets the eye safety standards, yet has sufficient power to transmit a fiber-optic signal over a considerable length of fiber-optic cable, depending to some extent upon the wave length of the optical transmitter.

Although a preferred embodiment of the invention has been disclosed herein for illustration, it should be understood that various changes, modifications and substitutions may be incorporated in such embodiment without departing from the spirit of the invention, which is defined by the claims as follows:

What is claimed is:

1. A fiber-optic transceiver for asynchronous communication of data, comprising:

means for receiving from a terminal device a digital data signal having high states and low states;

means for generating a series of optical pulses from the data signal, without a clock signal, said optical pulses operating between first and second states, wherein a first optical pulse arrangement represents and occurs in response to a rising edge of the data signal and operates between said first and second states and a second optical pulse arrangement represents and occurs in response to a falling edge of the data signal and also operates between said first and second states, the first and second pulse arrangements, respectively, occurring repetitively at preselected times during said high and low states if the high and low states exceed a preselected length of time;

means for transmitting said series of optical pulses along a fiber-optic cable;

means for receiving a transmitted series of optical pulses from a fiber-optic cable and for recognizing first and second pulse arrangements in the series of optical pulses and reconstructing a digital data signal having high and low states therefrom, the reconstructed digital data signal being a substantial replication of the digital data signal from which the series of optical pulses were generated; and means for providing said reconstructed digital data signal to the terminal device.

2. An apparatus of claim 1, wherein the time between the rising and falling edges of the digital data signal and the resulting first and second pulse arrangements is approximately one bit internal of the digital data signal.

3. An apparatus of claim 1, wherein the repetitive occurrences of the first pulse arrangement has an average energy approximately equal to the average energy of the repetitive occurrences of the second pulse arrangement.

4. An apparatus of claim 1, wherein the first pulse arrangement is a double pulse and the second pulse arrangement is a single pulse.

5. An apparatus of claim 4, wherein the preselected time for the first pulse arrangement is approximately ½ bit interval and the preselected time for the second pulse arrangement is approximately one bit interval.

6. An apparatus of claim 1, wherein power for the apparatus is obtained from the electronic terminal device.

7. An apparatus of claim 1, wherein the series of optical pulses has a duty cycle which is less than 30%.

8. An apparatus of claim 7, wherein the transmitted series of optical pulses has a power level which presents substantially no danger to the eyes of the user.

9. An apparatus of claim 1, including means for providing handshaking for the terminal device.

10. An apparatus of claim 1, wherein the generating means includes a small, low power laser and a transmitter encoder for generating driving signals for the laser from the digital data signal.

11. An apparatus of claim 10, wherein the laser is a VCSEL laser and the transmitter encoder driving means includes digital logic means and a clock oscillator for driving said digital logic means.

12. An apparatus of claim 1, wherein the generating means includes an LED and means for generating driving signals for the LED from the digital data signal.

13. An apparatus of claim 1, wherein the generating means is capable of using the digital data signal directly from the data terminal, without any modification of its format or other characteristics.

14. An apparatus of claim 13, including four amplifier stages, wherein the first amplifier stage maximizes the signal-to-noise ratio for a given optical receiver level, wherein the second and third stages provide amplification of said digital pulses and wherein the fourth stage converts the signal to the receiver into a digital signal.

15. An apparatus of claim 13, wherein the receiving means is AC coupled, and the receiver decoder includes digital logic means and a clock oscillator for driving the digital logic means.

16. An apparatus of claim 1, wherein the receiving means includes a pin photodiode, a plurality of amplifier stages, a receiver decoder and a level shifter for generating a reconstructed digital data signal.

17. An apparatus of claim 1, wherein said first state is approximately zero.

* * * * *